United States Patent [19] [11] Patent Number: 4,965,125
Masaki et al. [45] Date of Patent: Oct. 23, 1990

[54] MAGNETIC RECORDING MEDIUM AND THE METHOD FOR PREPARING THE SAME

[75] Inventors: Kouichi Masaki; Hideaki Kosha; Toshihiko Miura; Yasuo Tamai, all of Kanagawa, Japan

[73] Assignee: Fuji Photo Film Co., Ltd., Kanagawa, Japan

[21] Appl. No.: 182,672

[22] Filed: Apr. 18, 1988

[30] Foreign Application Priority Data

Apr. 17, 1987 [JP] Japan .................................. 62-93387
Aug. 18, 1987 [JP] Japan ............................... 62-203364

[51] Int. Cl.$^5$ ............................................ G11B 23/00
[52] U.S. Cl. ..................................... 428/329; 427/131; 427/407.1; 427/419.1; 428/408; 428/694; 428/695; 428/900
[58] Field of Search ............... 428/329, 694, 900, 695; 427/131, 407.1, 419.1

[56] References Cited

U.S. PATENT DOCUMENTS

| 4,643,941 | 2/1987 | Miyoshi et al. | 428/694 |
| 4,743,500 | 5/1988 | Miyoshi et al. | 428/900 |
| 4,784,914 | 11/1988 | Matsufuji et al. | 428/695 |
| 4,798,755 | 1/1989 | Yamada et al. | 428/695 |

Primary Examiner—Paul J. Thibodeau
Attorney, Agent, or Firm—Sughrue, Mion, Zinn, Macpeak & Seas

[57] ABSTRACT

A magnetic recording medium is described, comprising a non-magnetic support having thereon a magnetic layer containing ferromagnetic particles dispersed in a binder, the ferromagnetic layer containing abrasive agent particles alone or in combination with lubricating agent particles, wherein the weight ratio of (a) the abrasive agent particles which are present, or each of the abrasive agent particles and lubricating agent particles which are present, within 1 μm in a thickness direction from the surface of the magnetic layer to (b) the abrasive agent particles or each of the abrasive agent particles and lubricating agent particles which are present, within the whole magnetic layer is at least 100/(thickness of the magnetic layer − 1) % in which the "thickness of the magnetic layer" represents the thickness in "μm" and is 2 μm or more.

A method for preparing a magnetic recording medium comprising: coating on a non-magnetic support a first coating composition having ferromagnetic particles dispersed in a binder, and simultaneously or successively coating thereon a second coating composition having a binder in which there is despersed abrasive agent particles alone or in combination with lubricating agent particles.

8 Claims, 1 Drawing Sheet

MAGNETIC RECORDING MEDIUM AND THE METHOD FOR PREPARING THE SAME

FIELD OF THE INVENTION

The present invention relates to a magnetic recording medium having improved electromagnetic characteristics, running properties and durability and the method for preparing the same.

BACKGROUND OF THE INVENTION

Generally, a magnetic layer of a magnetic recording medium is prepared by coating on a non-magnetic support, such as a polyester film, a coating solution containing magnetic particles and inorganic particles such as carbon black particles or alumina particles, providing a magnetic orientation treatment and then drying the coating solution. The inorganic particles are added to improve antistatic property, wear resistance and running durability, and are uniformly dispersed in a binder and an organic solvent with the magnetic particles to prepare the coating solution.

Recently, as magnetic recording media have been used in various fields, various characteristics have been demanded for the media and such demand has become very severe. Particularly, there has been a need for a magnetic recording medium which has excellent durability and which is suitable for higher density recording.

On the one hand, in order for a magnetic recording medium to achieve high density recording, certain conditions must be satisfied. First, inorganic particles, such as the magnetic particles as a main component in a magnetic coating composition should be uniformly dispersed in a binder to form the coating solution. Second, excellent magnetic characteristics, extremely low surface roughness and extremely smooth coated surface should be obtained after the coating solution is coated and dried.

On the other hand, it is known that abrasive agent particles such as $\alpha\text{-}Al_2O_3$, $Cr_2O_3$ or $\alpha\text{-}Fe_2O_3$ are added into the magnetic layer to improve sliding properties of a magnetic head and to improve durability of the magnetic recording medium. It is also known that lubricating agent particles such as carbon black, graphite or molybdenum sulfide are added into the magnetic layer to improve running properties. However, the above described abrasive agent particles and lubricating agent particles are non-magnetic particles and when they are used in a large amount, the electromagnetic properties deteriorate. Therefore, various techniques regarding shapes, sizes and the mixing ratios have been developed to attempt to overcome these problems.

Such techniques are specifically disclosed in Japanese Patent Publication Nos. 28642/77, 18561/77 and 9041/79 and Japanese Patent Application (OPI) Nos. 179945/82, 189826/83, 6439/82, 88307/77 and 119932/81. The term "OPI" as used herein means an unexamined published Japanese Patent Application.

However, the above techniques are not satisfactory and there are still some problems which remain to be solved. Thus in the known techniques, the above described lubricating agent particles and abrasive agent particles are dispersed with magnetic particles in a magnetic coating solution and are uniformly distributed in a magnetic layer.

Since the above described lubricating agent particles and abrasive agent particles are uniformly distributed in the magnetic layer, most of particles do not effectively work their functions because they are not near the surface of the magnetic layer and thus do not contact the magnetic head, guide parts of a VTR (Video Tape Recorder) and the system parts of a cassette. To achieve sufficient improvement in durability and running properties, the abrasive agent particles and lubricating agent particles need to be added in a large amount. However, when they are added in a large amount to provide sufficient durability and running properties on the surface of the magnetic layer, the electromagnetic properties deteriorate and the number of drop outs increases due to the increased contact of the particles with the magnetic head and guide parts of the VTR and with the system parts of a cassette. On the other hand, when they are added in a smaller amount, sufficient durability and running properties can not be realized.

SUMMARY OF THE INVENTION

Therefore, one object of the present invention is to provide a magnetic recording medium having improved durability and running properties without deteriorating electromagnetic properties.

Another object of the present invention is to provide a method for preparing the same.

To achieve the above objects, as a result of a thorough investigation, the inventors of the present invention found that the magnetic recording medium described below is the most effective to attain the object of the present invention. The present invention relates to a magnetic recording medium comprising a non-magnetic support having thereon a magnetic layer containing ferromagnetic particles dispersed in a binder, the ferromagnetic layer containing abrasive agent particles alone or in combination with lubricating agent particles, wherein the weight ratio of (a) the abrasive agent particles which are present, or each of the abrasive agent particles and lubricating agent particles which are present, within 1 μm in a thickness direction from the surface of the magnetic layer to (b) the abrasive agent particles or each of the abrasive agent particles and lubricating agent particles which are present, within the whole magnetic layer is at least 100/(thickness of the magnetic layer−1) % in which the "thickness of the magnetic layer" represents the thickness in "μm" and is 2 μm or more.

DETAILED DESCRIPTION OF THE INVENTION

The present invention will be hereinafter illustrated in more detail.

The magnetic recording medium of the present invention can be prepared by a wet-on-wet coating method such as a simultaneous multiple coating method or a successive multiple coating methods, as disclosed in Japanese Patent Application (OPI) Nos. 139929/86 and 54992/86.

The wet-on-wet coating method refers to a so-called successive coating method wherein a first layer is coated and immediately thereafter the second layer is coated thereon while the first layer is wet, or a simultaneously multiple extrusion coating method wherein multiple layers are simultaneously coated by an extrusion method.

Figure 1:
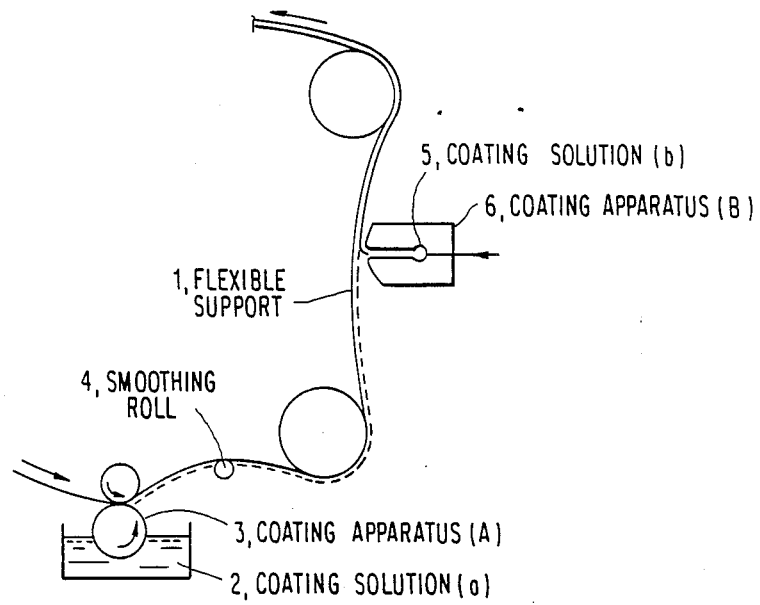
FIG. 1 is a drawing illustrating one embodiment of a wet-on-wet coating method employing a successive coating which can be used to prepare the magnetic recording medium of the present invention.

Referring now to FIG. 1 which illustrates the above described wet-on-wet successive coating method, a first coating solution (a) 2 is pre-coated by a coating apparatus (A) 3 on a non-magnetic flexible support 1 such as, for example, a polyethylene terephthalate support which runs continuously. Immediately thereafter the coated surface undergoes a smoothing treatment by a smoothing roll 4, and a second coating solution (b) 5 which is provided by a extrusion coating apparatus (B) 6 is coated thereon while first coating solution (a) 2 remains wet.

Figure 2:
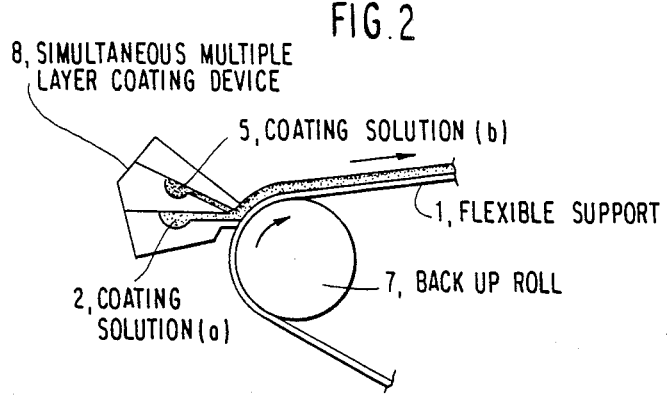
FIG. 2 is a drawing illustrating another embodiment of a wet-on-wet coating method employing a simultaneous multiple coating technique which can be used to prepare the magnetic recording medium of the present invention.

The wet-on-wet coating method which can be used in the practice of the present invention is not limited to the above-described method but other wet-on-wet methods can be used such as that shown in FIG. 2 which illustrates a simultaneously multiple extrusion coating method.

In the wet-on-wet coating method illustrated in FIG. 2, first coating solution (a) 2 and second coating solution (b) 5 are simultaneously coated on flexible support 1 by using a simultaneous multiple layer coating device 8 which applies the coating solutions onto flexible support 1 which passes by device 8 on a back up roll 7.

The above described first coating solution (a) 2 is a dispersion having uniformly dispersed ferromagnetic particles mainly comprised of ferromagnetic particles, binders, various additives and solvents.

The above described second coating solution (b) 5 is a dispersion having uniformly dispersed abrasive agent particles alone or abrasive agent particles and lubricating agent particles.

Abrasive agent particles which can be employed in the second coating solution (a) 5 include α-alumina (α-Al$_2$O$_3$), γ-alumina, silicon carbide, chromium oxide (Cr$_2$O$_3$), silica (SiO$_2$), α-Fe$_2$O$_3$, TiO$_2$ and zirconia, which are used alone or in combination. Among these, α-Al$_2$O$_3$, Cr$_2$O$_3$, α-Fe$_2$O$_3$ or SiO$_2$ is preferably used as abrasive agent particles. These abrasive agent particles have Moh's hardness of 5 or more, and an average particle size of preferably from 0.005 to 1.0 μm, and more preferably from 0.01 to 0.5 μm.

As lubricating agent particles which can be used in the second coating solution (b) 5, carbon black is the most desirable. Carbon black has a different dispersing rate from that of abrasive agent particles, and therefore it is desirable that the lubricating agent particles are dispersed alone and thereafter mixed with the dispersion of the abrasive agent particles.

Examples of carbon black which can be used in the present invention include furnace black, thermal black or acetylene black as classified from the standpoint of manufacturing steps and having an average particle size of preferably from 30 to 300 mμ (i.e., from 0.03 to 0.3 μm), and more preferably from 40 to 150 mμ (i.e., from 0.04 to 0.15 μm).

Lubricating agent particles which can be used other than carbon black include, for example, inorganic particles such as graphite, molybdenum sulfide, brimstone or mica, and plastic fine particles such as hydrocarbon type fine particles or polyethylene. These particles preferably have an average particle size of from 0.005 to 1.0 μm, and more preferably from 0.01 to 0.5 μm.

Upon preparing a coating solution (dispersion solution) of the abrasive agent particles, the abrasive agent particles and organic solvents may be combined and dispersed. It is desirable that the abrasive agent particles, binders and organic solvents are dispersed together at the same time.

To prepare a coating solution (dispersion solution) of carbon black, the above described carbon black and organic solvents may be dispersed in combination at the same time. It is preferred that the above carbon black, binders and organic solvents are dispersed in Combination at the same time.

It is preferable that the organic solvents and binders which are used in the first coating solution have good compatibility with the organic solvents and binders used in the second coating solution. When they have poor compatibility, the coated layer of the first coating solution can not have good contact with the coated layer of the second coating solution, resulting in poor surface properties, which is unfavorable.

Organic solvents which can be used in the practice of the present invention include ketone solvents such as methyl ethyl ketone, methylisobutyl ketone or cyclohexanone; aromatic hydrocarbon solvents such as toluene or xylene; alcohols such as methyl alcohol, ethyl alcohol or isopropyl alcohol; and esters such as ethyl acetate, methyl acetate or butyl acetate, which may be used alone or in combination. Among these, methyl ethyl ketone, cyclohexanone, toluene, butyl acetate and methyl acetate are preferably used as organic solvents.

Binders which can be used in the present invention include polyurethane resins, polyester resins, epoxy resins, phenoxy resins, polyvinyl butyral resins, cellulose derivatives (cellulose acetate butyrate, nitrocellulose, cellulose triacetate and the like), copolymers of vinyl chloride and vinyl acetate, and thermoplastic resins of various synthetic rubber type, which may be used alone or in combination.

Particularly preferred binders are vinyl chloride copolymers, polyurethane resins and polyester resins having functional groups such as —SO$_3$M, —COOM, —OM, —OSO$_3$, or

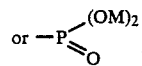

in the molecule. In the above formulae, M is hydrogen or an alkali metal (e.g., Li, Na, K and the like) and M' is hydrogen, an alkali metal (e.g., Li, Na, K and the like) or a hydrocarbon group.

Resins having the above functional groups are disclosed in Japanese Patent Application (OPI) Nos. 8127/84, 44227/82, 92422/82, 92423/82 and 40302/84 and can be used in the present invention.

Vinyl chloride type copolymers having the above functional groups and epoxy groups can also be used, as described in Japanese Patent Application (OPI) No. 146432/87.

The preferred combination of binders is that of a vinyl chloride type copolymer and polyurethane having the above described functional groups (a ratio of vinyl chloride type copolymer to polyurethane is preferably from 30/70 to 80/20 and particularly preferably from 40/60 to 70/30.) The preferred polyurethane includes polyester polyurethane, polyether polyurethane, polyester ether polyurethane, polycaprolactone polyurethane, and polycarbonate polyurethane and polyurethane having the above described functional groups is particularly preferred.

The specific examples of binders having hydrophilic groups include a -COOH group-containing polyurethane ("TIM-3005", trade mark for product manufactured by Sanyo Chemical Industries, Ltd.), a —SO$_3$Na group-containing polyurethane ("UR-8300" and "UR-8600" trade mark for products manufactured by Toyobo Co., Ltd.), a —COOH group-containing vinyl chloride and vinyl acetate copolymer ("400×110A", manufactured by Nippon Zeon Co., Ltd.), a —SO$_3$Na group-containing polyester ("Byron 530", trade mark for product manufactured by Toyobo Co., Ltd.), and a —SO Na group-containing vinyl chloride and vinyl acetate copolymer ("MR-110", trade mark for product manufactured by Nippon Zeon Co., Ltd.). Among these, particularly "400×100A", "MR 110", and "UR 8300" are preferred. The content of hydrophilic group is preferably from 1 to 10,000 equivalent/$10^6$ grams and the molecular weight thereof is preferably from 3,000 to 200,000.

Conventional methods for dispersing the binders can be used in the practice of the present invention. Examples of dispersing devices which can be used in the present invention include a ball mill, a homomixer, a sand mill, a sand grinder, a pebble mill, a trommel, a Szegvari, an attritor, a high speed stone mill, a high speed impact mill, a high speed mixer and a homogenizer.

To prepare dispersion of the abrasive agent particles and the lubricating agent particles, the dispersing period can be optionally determined depending on the apparatus to be used, kinds of each particle and binders and is generally from 1 to 60 hours and preferably from 1 to 10 hours.

A dispersion of abrasive agent particles or lubricating agent particles wherein each particle is dispersed as a primary particle (the term "a primary particle" as used herein means "a dispersed particle in which is obtained by the dispersion of a coagulated particle (i.e., a secondary particle)") can be obtained by filtrating each dispersion to remove associated substances contained in a slight amount in each dispersion.

Examples of ferromagnetic particles which can be used in the magnetic layer include ferromagnetic iron oxide particles, cobalt adhered ferromagnetic iron oxide particles, ferromagnetic chromium dioxide particles, ferromagnetic metal particles and barium ferrite.

These ferromagnetic particles have coercive force (Hc) of preferably from 350 to 5000 Oe, and more preferably from 600 to 2500 Oe. When the coercive force is 350 Oe or lower, outputs at a short wave length region decrease. When the coercive force exceeds 5000 Oe, recording can not be done with a normal head, and this, of course, is not desirable.

Ferromagnetic particles having an acicular shape preferably are used, and the acicular ratio is preferably from 2/1 to 20/1 and more preferably from 5/1 to 20/1, and the average length (long axis length) is generally from 0.1 to 2.0 $\mu$m and preferably 0.1 to 0.5 $\mu$m.

The shape of the ferromagnetic particles which can be used is not limited to an acicular shape, but other shapes can also be used such as an ellipsoidal shape and a tabular shape and other generally employed shapes.

It is particularly preferred that the ferromagnetic particles employed in the practice of the present invention have an average length in the long axis of 0.3 $\mu$m or less and a crystal size of 400 Å or less measured by X-ray analysis. More preferably, the acicular particles have a an average in the long axis of 0.2 $\mu$m or less and a crystal size of 350 Å or lower.

In the case when ferromagnetic metal particles are used, 75 wt% or more (preferably 80 wt% or higher) of the metal content of the ferromagnetic metal particles is composed of preferably a ferromagnetic metal or alloy (e.g., Fe, Co, Ni, Fe-Co, Fe-Ni, Co-Ni, Fe-Co-Ni, Fe-Zn-Ni) having the average length in the long axis of 1.0 $\mu$m or less, and particularly from 0.1 to 0.3 $\mu$m.

When barium ferrite is used, the diameter of the plate of tabular particles is preferably from 0.02 to 0.2 $\mu$m (more preferably from 0.03 $\mu$m to 0.10 $\mu$m) and the ratio (diameter/thickness) of the tabular particles is preferably from 2 to 20, and more preferably from 3 to 10.

The binders of the present invention include, in addition thermoplastic resins used for dispersing abrasive agent particles or carbon black, hardening agents, thermosetting resins and reactive type resins, and can be used alone or in combination.

When a sheet-like non-magnetic support is used, the non-magnetic support generally has a thickness of from 5 to 100 $\mu$m, and is provided with a backing layer on the opposite surface to the magnetic layer, if desired.

The magnetic layer coated on the above described non-magnetic support is subjected to magnetic orientation to orientate ferromagnetic particles contained in the magnetic layer and then is dried. Further, the magnetic layer then is subjected to heat treatment to harden the resin component, and thereafter is subjected to surface smoothing treatment if desired. The surface smoothing treated magnetic recording medium then is blade-treated, if desired, and is cut to a desired shape.

In the present invention, as illustrated in FIGS. 1 and 2, first coating solution (a) 2 containing ferromagnetic particles dispersed in a binder is coated on non-magnetic flexible support 1 and second coating solution (b) 5 containing abrasive agent particles, or abrasive agent particles and lubricating agent particles dispersed in a binder is coated thereon simultaneously (FIG. 2) or successively (FIG. 1) while the first coating solution is wet. Therefore, the abrasive agent particles and lubricating agent particles do not diffuse into the magnetic layer, but partially exist on or near the surface thereof.

It is preferred that at least one of the binders in the first coating solution is the same or is the same kind of binder as in the second coating solution, or that the same or same kinds of binders and solvents are used in the first and second coating solutions 2 and 5, to make the first and second layers continuously and to change the distribution of abrasive agent particles or abrasive agent particles and lubricating agent particles continuously in the thickness direction of the magnetic layers so that two layers appear to be one layer. In this instance, two layers may be deemed to be one layer magnetically.

A layer prepared from second coating solution (b) 5 may be completely independent from the layer prepared from the first coating solution (a) 2. If this is the case, the thickness of the layer prepared from the second coating solution must be considered so that outputs do not decrease due to spacing loss thereof.

The surface of the magnetic layer, i.e., the surface layer referred to in the present invention, whether of the discontinuous type where the layer prepared from the first coating solution is completely independent from the layer prepared from the second coating solution, or, of the continuous type where there is a continuous change in the distribution of the abrasive agent particles or abrasive agent particles and lubricating agent particles, is mainly composed of abrasive agent particles or abrasive agent particles and lubricating agent particles in the present invention. The thickness of the magnetic layer referred to in the present invention means the whole thickness of the magnetic layer including the surface layer mainly composed of abrasive agent particles or abrasive agent particles and lubricating agent particles.

It is preferred in the present invention that all abrasive agent particles or all abrasive agent particles and lubricating agent particles exist within 1 μm from the surface of a magnetic layer in the thickness direction. The above state is not limited. Thus, satisfactory results can also be obtained if only a portion of these particles are present within 1 μm from the surface of the magnetic layer, as long as a certain minimum portion of the particles exist within 1 μm of the surface of the magnetic layer. In this instance, when the thickness of the magnetic layer is represented in "μm" as A (A>2), the weight ratio of abrasive agent particles and lubricating agent particles which are present within 1 μm from the surface of the magnetic layer in the thickness direction to the abrasive agent particles and lubricating agent particles which are present within the whole magnetic layer should be 100/(A-1)% or more. The magnetic layer has a thickness of generally from about 2 μm to 6 μm and preferably from about 2 μm to 4 μm. For example, if the magnetic layer has a thickness of 3 μm, "A-1" is 2, and 100/A-1=100/2(%)=50(%). Thus, in this case, at least 50% of the abrasive agent particles or the abrasive and lubricating agent particles in the entire magnetic layer should be within 1 μm of the surface of the magnetic layer, that is, it is in the top 1 μm of the magnetic layer. When the weight ratio of particles is lower than the above described ratio, the amounts of abrasive agent particles and lubricating agent particles to be added must be increased, thereby deteriorating electromagnetic properties and increasing drop outs.

In the present invention, since the abrasive agent particles and lubricating agent particles exist partially on the surface of the magnetic layer, the additive amounts thereof can be smaller than the amounts conventionally employed, whereby the electromagnetic properties do not deteriorate and the durability and the running properties of the magnetic recording medium can be assured.

In a conventional method, the abrasive agent particles uniformly distribute within the magnetic layer. Therefore, abrasive agent particles having relatively large particle diameter are necessary to provide sufficient abrasive effect. In the present invention, since the abrasive agent particles exist partially on the surface of the magnetic layer, abrasive agent particles having smaller particle diameters than the conventional ones can provide sufficient abrasive agent effects, thereby reducing spacing loss between the magnetic head and the surface of the magnetic layer.

The same thing can be said regarding the lubricating agent particles such as carbon black. The larger the particle size of the carbon black, the more effective it is to reduce the friction coefficient of a tape. However, when the particle size thereof is larger, particles readily peel apart from the surface of the tape, causing drop outs and staining of the running system. In the present invention, since carbon black is present only on or near the surface of the magnetic layer, even carbon black having a small particle size can decrease the friction coefficient. Thus, abrasive agent particles and carbon black having a smaller partible size than the conventional size can be used in the present invention, and accordingly, drop outs and noise can be reduced and electro-magnetic properties can be improved.

The present invention will be illustrated in more detail by the following Examples and Comparative Examples to clearly show the novel effects of the present invention. These examples are not to be construed as limiting the present invention.

In the Examples and Comparative Examples, all parts are by weight unless otherwise mentioned.

EXAMPLE 1

The following abrasive agent particles composition was mixed using a kneader and then dispersed in a ball mill for 18 hours. The abrasive agent particles used herein were $\alpha Al_2O_3$ (average particle diameter 0.3 μm), $SiO_2$ (average particle diameter 0.02 μm), $Cr_2O_3$ (average particle diameter 0.5 μm) or $\gamma-Al_2O_3$ (average particle diameter 0.02 μm)

COMPOSITION OF ABRASIVE AGENT PARTICLES DISPERSION

| Abrasive agent (See Table 1) | 100 parts |
| Copolymer of vinyl chloride/ vinyl acetate/maleic anhydride (400 × 110A, manufactured by Nippon Zeon Co., Ltd., degree of polymerization: 400) | 20 parts |
| Methyl ethyl ketone | 100 parts |

After dispersing the composition, the dispersion was filtrated through a filter having an average pore diameter of 1 μm to prepare a dispersion of abrasive agent particles.

A first coating solution having the following composition was prepared.

COMPOSITION OF FERROMAGNETIC PARTICLES DISPERSION

| Ferromagnetic metal particles (Composition: Fe—Ni alloy, specific surface area: 50 m²/g | 100 parts |
| Copolymer of vinyl chloride/vinyl acetate/maleic anhydride (400 × 110Å, manufactured by Nippon Zeon Co., Ltd., degree of polymerization: 400 | 12 parts |
| Polyurethane resin ("N-2301", a trade name, manufactured by Nippon Polyurethane Co., Ltd.) | 12 parts |
| Isocyanate hardening agent ("Collonate L", a trade name, manufactured by Nippon Polyurethane Co., Ltd.) | 8 parts |
| Stearic acid | 5 parts |
| Butyl stearate | 5 parts |
| Methyl ethyl ketone | 320 parts |

The above composition was dispersed and filtrated using a filter having an average pore diameter of 1 μm to prepare a first coating solution.

Methyl ethyl ketone was added into the abrasive agent particles dispersion in an amount as shown in Table 1, and then was sufficiently mixed to dilute the dispersion to prepare a second coating solution.

The first coating solution was coated on a polyethylene terephthalate support having a 10 μm thickness at a coating speed rate of 100 m/min. The first solution was supplied in an amount of 20 ml/m² using an extrusion type coating head (FIG. 2) having two slits in the head. The second coating solution was simultaneously multi-coated from the coating head at the same coating speed rate. The coated solution was subjected to magnetic orientation, dried and then subjected to calendering treatment, and slit to 8 mm width to prepare a 8 mm video tape.

The weight ratio of the abrasive agent particle dispersion to the solvent used to dilute the abrasive grain particle dispersion to form the second coating solution (diluting ratio) and the amount of the second coating solution to be supplied upon simultaneously multi-coating relative to the amount of the first coating solution are shown in Table 1.

Using a commercially available 8 mm video recorder ("FUJIX-8", M6AF2, a trade name, manufactured by Fuji Photo Co., Ltd.), the thus obtained tape was tested regarding video sensitivities, SN ratio, number of passes until a head gap bridging occurs, outputs after 100 passes and friction coefficient at the 1st pass and the 100th pass. The weight ratio of abrasive agent particles which are present within 1 μm from the surface of the magnetic layer in the depth direction to abrasive particles which are present within the whole magnetic layer was measured. The testing and measuring techniques employed are described in detail in comparative example 4.

The results are shown in Table 2.

COMPOSITION OF FERROMAGNETIC PARTICLES DISPERSION

| | |
|---|---|
| Ferromagnetic metal particles (composition: Fe—Ni alloy, specific surface area: 50 m²/g) | 100 parts |
| Copolymer of vinyl chloride/vinyl acetate/maleic anhydride (400 × 110A, manufactured by Nippon Zeon Co., Ltd., degree of polymerization: 400 | 12 parts |
| Polyurethane resin ("N-2301", a trade name, manufactured by Nippon Polyurethane Co., Ltd.) | 12 parts |
| Abrasive agent particles (See Table above for additive amount) | x parts |
| Carbon black (average particle diameter: 0.04 μm) | 1 part |
| Isocyanate hardening agent ("Collonate L", a trade name, manufactured by Nippon Polyurethane Co., Ltd.) | 8 parts |
| Stearic acid | 5 parts |
| Butyl stearate | 5 parts |
| Methyl ethyl ketone | 320 parts |

The above composition was dispersed and filtrated using a filter having an average pore diameter of 1 μm to prepare a magnetic coating solution.

The thus prepared magnetic coating solution was coated at a coating speed rate of 100 m/min. with a supply amount of 20 ml/m² using an extrusion type coating head having one slit in the head and was subjected to magnetic orientation, dried and subjected to calendering treatment under the same conditions as in

TABLE 1

| | Type of abrasive agent particles | Diluting Ratio (Remark-1) | Ratio of amount of 2nd soln. to be supplied (Remark-2) | Thickness of magnetic layer (μm) |
|---|---|---|---|---|
| Example 1-1 | α-Al₂O₃ | 1/9 | 4.7 | 3.1 |
| Example 1-2 | αAl₂O₃ | 1/9 | 14.2 | 3.0 |
| Example 1-3 | SiO₂ | 1/19 | 4.7 | 3.0 |
| Example 1-4 | SiO₂ | 1/19 | 14.2 | 3.1 |
| Example 1-5 | Cr₂O₃ | 1/19 | 2.3 | 2.8 |
| Example 1-6 | γ-Al₂O₃ | 1/9 | 4.7 | 3.1 |
| Example 1-7 | γ-Al₂O₃ | 1/19 | 14.2 | 3.0 |

Remark-1: The weight ratio of the dispersion to the solvent.
Remark-2: The weight ratio of the supplying amount of 2nd coating solution when the supplying amount of 1st coating solution is assigned a value of 100.

COMPARATIVE EXAMPLE 1

A magnetic coating solution having the following ferromagnetic particle dispersion with abrasive agent particles as shown below was prepared.

| | Abrasive agent particles | | |
|---|---|---|---|
| | Type | Average agent particles size | Additive amount (part) |
| Comparative Example 1-1 | α-Al₂O₃ | 0.3 μm | 3 |
| Comparative Example 1-2 | SiO₂ | 0.02 μm | 1.5 |
| Comparative Example 1-3 | Cr₂O₃ | 0.5 μm | 0.5 |

Example 1 and was slit to 8 mm width to prepare a 8 mm video tape.

Using a commercially available 8 mm video recorder ("FUJIX-8"), video sensitivities, SN ratios, number of passes until head gap bridging occurs and outputs at the first pass and 100th pass were measured regarding the thus obtained video tape, and the weight ratio of abrasive agent particles which are present within 1 μm from the surface of the magnetic layer to abrasive particles which are present within the whole magnetic layer was measured in the same manner as in Example 1.

The results are shown in Table 2.

TABLE 2

| | Type of abrasive agent particles | Coating method | Video sensitivity (dB) | S/N (dB) | Number of passes until head gap bridging occurs | Decrease of outputs after 100 passes (dB) | Friction coefficient first pass | Friction coefficient 100th pass | Ratio of abrasive agent particles (%)* |
|---|---|---|---|---|---|---|---|---|---|
| Example 1-1 | α-Al$_2$O$_3$ | Wet-on-wet method | 1.0 | 1.5 | 200 or more | −1.0 | 0.31 | 0.34 | 100 |
| Example 1-2 | α-Al$_2$O$_3$ | Wet-on-wet method | 0.5 | 1.0 | " | −0.7 | 0.28 | 0.33 | " |
| Example 1-3 | SiO$_2$ | Wet-on-wet method | 1.5 | 2.0 | 180 | −1.5 | 0.33 | 0.35 | " |
| Example 1-4 | SiO$_2$ | Wet-on-wet method | 1.0 | 1.5 | 200 or more | −1.4 | 0.32 | 0.35 | " |
| Example 1-5 | Cr$_2$O$_3$ | Wet-on-wet method | 0.9 | 1.0 | 190 | −1.0 | 0.33 | 0.33 | " |
| Example 1-6 | γ-Al$_2$O$_3$ | Wet-on-wet method | 1.2 | 1.5 | 200 or more | −1.2 | 0.29 | 0.34 | 90 |
| Example 1-7 | γ-Al$_2$O$_3$ | Wet-on-wet method | 1.4 | 1.8 | " | −1.4 | 0.31 | 0.34 | 80 |
| Comparative Example 1-1 | α-Al$_2$O$_3$ | Single layer | 0.0 | 0.0 | 110 | −7.0 | 0.33 | 0.34 | 30 |
| Comparative Example 1-2 | SiO$_2$ | " | 0.0 | 0.5 | 45 | −20 or less | 0.35 | 0.46 | 28 |
| Comparative Example 1-3 | Cr$_2$O$_3$ | " | 0.5 | 0.0 | 35 | " | 0.36 | 0.42 | 25 |

*Weight ratio of abrasive particles which are present within 1 μm from the surface of the magnetic layer in the depth direction to abrasive agent particles which are present in the whole magnetic layer.

It is clearly seen from the results shown in Table 2 that the tapes of the present invention where abrasive agent particles exist in higher ratios at the area near the surface of the magnetic layer exhibited better characteristics in such categories as outputs, S/N ratios, head gap bridging or running properties than those of the Comparative Examples where the abrasive agent particles were uniformly dispersed within the magnetic layer. The decrease of outputs after 100 passes was extremely small in the tapes of the present invention.

EXAMPLE 2

The following composition for an abrasive agent particles dispersion was mixed using a kneader and then dispersed for 18 hours using a ball mill. α-Al$_2$O$_3$ (average particle diameter 0.3 μm) or SiO$_2$ (average particle diameter 0.02 μm) was used as abrasive agent particles.

COMPOSITION FOR ABRASIVE AGENT PARTICLES DISPERSION

| | |
|---|---|
| Abrasive agent particles (See Table 3) | 100 parts |
| Copolymer of vinyl chloride/vinyl acetate/maleic anhydride (400 × 110Å, manufactured by Nippon Zeon Co., Ltd., degree of polymerization: 400) | 20 parts |
| Methyl ethyl ketone | 100 parts |

The above composition was dispersed and filtrated using a filter having an average pore diameter of 1 μm to prepare an abrasive agent particles dispersion.

The following composition for a carbon black dispersion was mixed and kneaded using a kneader, the solvent was added thereto and dispersed for 40 hours using a ball mill. Carbon black having an average particle diameter of 60 mμ (specific surface area by BET method, 45 m$^2$/g) or carbon black having an average particle diameter of 120 mμ (specific surface area by BET method: 25 m$^2$/g) was used.

COMPOSITION FOR CARBON BLACK DISPERSION

| | |
|---|---|
| Carbon black (See Table 3) | 100 parts |
| Copolymer of vinyl chloride/vinyl acetate/maleic anhydride ("400 × 110A", manufactured by Nippon Zeon Co., Ltd., degree of polymerization: 400) | 40 parts |
| Methyl ethyl ketone | 160 parts |
| Methyl ethyl ketone (added in a ball mill) | 700 parts |

The above composition was dispersed in a ball mill and filtrated using a filter having an average pore diameter of 1 μm to prepare a carbon black dispersion.

A first coating solution having the following composition was prepared.

COMPOSITION FOR FERROMAGNETIC PARTICLE DISPERSION

| | |
|---|---|
| Ferromagnetic metal particles (composition: Fe—Ni alloy, specific surface area: 50 m$^2$/g) | 100 parts |
| Copolymer of vinyl chloride/vinyl acetate/maleic anhydride (400 × 110A, manufactured by Nippon Zeon Co., Ltd., degree of polymerization: 400) | 12 parts |
| Polyurethane resin ("N-2301", a trade name, manufactured by Nippon Polyurethane Co., Ltd.) | 12 parts |
| Isocyanate hardening agent ("Collonate L", a trade name, manufactured by Nippon Polyurethane Co., Ltd.) | 8 parts |
| Stearic acid | 5 parts |
| Butyl stearate | 5 parts |
| Methyl ethyl ketone | 320 parts |

After the above composition was dispersed, the dispersion was filtrated using a filter having an average pore diameter of 1 μm to prepare the first coating solution.

The abrasive agent particles dispersion and the carbon black dispersion were mixed and methyl ethyl ketone was added thereto. The three compositions were mixed to dilute the dispersion to prepare a second coating solution. The weight ratio of the abrasive agent particles dispersion to the carbon black dispersion is shown in Table 3 which also shows the weight ratio of the abrasive agent particles dispersion plus the carbon black dispersion to the methyl ethyl ketone solvent used to dilute the two dispersions to form the second coating solution.

The first coating solution was coated on a polyethylene terephthalate support having a 10 μm thickness at a coating speed rate of 100 m/min. with a supplying amount of 20 ml/m² using an extrusion type coating head (FIG. 2) having two slits in the head, and simultaneously the diluted mixed dispersion of abrasive agent particles and carbon black, that is, the second coating solution, was multi-coated thereon, orientated, dried, calendering-treated and slit to a 8 mm width to prepare a 8 mm video tape.

The mixing ratio of the dispersions of abrasive agent particles and carbon black, the diluting ratio with methyl ethyl ketone and the supplying amounts of the first and the second coating solutions upon simultaneously multicoating are shown in Table 3 for Sample Nos. (Examples) 2-1 to 2-7.

Using a 8 mm video recorder ("FUJIX-8M6AF2", a trade name, manufactured by Fuji Photo Film Co., Ltd.), video sensitivities, SN ratios, number of passes until head gap bridging occurs, outputs after 100 passes and friction coefficient at first pass and at 100th pass) were measured on the thus obtained tapes. The weight ratio of carbon black and abrasive agent particles which are present within 1 μm from the surface of the magnetic layer to the carbon black and abrasive agent particles which are present within the whole magnetic layer was measured. The results are shown in Table 4.

dilute the mixture by 10 times was successively coated thereon in a coating amount of 36 ml/m² while the first coating solution was wet through another extrusion coating device. The coated layer was subjected to magnetic orientation, dried and subjected to calendering treatment and was slit to a 8 mm width to prepare a 8 mm video tape, which is designated as Sample (Example) No. 3-1.

The coating conditions 6 or Sample No. 3-1 are shown in Table 3 while the weight ratios of amounts of abrasive agent particles and carbon black which are present near the surface (within 1 μm) of the magnetic layer to the amounts present within the whole magnetic layer and the characteristics of the 8 mm video tape are shown in Table 4.

COMPARATIVE EXAMPLE 2

A ferromagnetic particles dispersion having the following composition was prepared using abrasive agent particles and carbon black as shown in Table 5. α-$Al_2O_3$ having an average particle diameter of 0.3 μm and $SiO_2$ having an average particle diameter of 0.02 μm were used.

TABLE 5

| Sample No. | Abrasive agent particles | Average particle diameter of carbon black |
| --- | --- | --- |
| Comparative Example 2-1 | α-$Al_2O_3$ | 60 mμ |
| Comparative Example 2-2 | α-$Al_2O_3$ | 120 mμ |
| Comparative Example 2-3 | $SiO_2$ | 60 mμ |

COMPOSITION FOR FERROMAGNETIC PARTICLE DISPERSION

TABLE 3

| | | Composition for Second Coating Solution | | | |
| --- | --- | --- | --- | --- | --- |
| Sample No. | Abrasive agent type | Average agent particle size of carbon black | Mixing ratio of dispersions (Remark-1) Abrasive agent particles/Carbon black | Diluting ratio of mixed dispersions (Remark-2) | Ratio of supplying amount of 2nd soln. (Remark-3) | Thickness of magnetic layer (μm) |
| 2-1 | α-$Al_2O_3$ | 60 mμ | 1/1.5 | 1/9 | 11.8 | 3.2 μm |
| 2-2 | α-$Al_2O_3$ | 35 mμ | 1/1.5 | 1/9 | 11.8 | 3.2 μm |
| 2-3 | α-$Al_2O_3$ | 60 mμ | 1/0.5 | 1/9 | 21.3 | 3.0 μm |
| 2-4 | " | 120 mμ | 1/1.5 | 1/9 | 11.8 | 3.0 μm |
| 2-5 | " | " | 1/0.5 | 1/9 | 21.3 | 3.2 μm |
| 2-6 | $SiO_3$ | 60 mμ | 1/0.5 | 1/9 | 21.3 | 3.2 μm |
| 2-7 | " | 120 mμ | 1/0.5 | 1/10 | 21.3 | 3.0 μm |
| 3-1 | γ-$Al_2O_3$ | 60 mμ | 1/1.5 | 1/10 | 21.0 | 3.0 μm |

Remark-1: The weight ratio of abrasive agent particles to carbon black particles.
Remark-2: The weight ratio of the mixed dispersion to the solvent.
Remark-3: The weight ratio of the supplying amount of the second coating solution when the supplying amount of the first coating solution (magnetic particles dispersion) is assigned a value of 100.

EXAMPLE 3

A successive wet coating (FIG. 1) in accordance with the present invention was done using the same coating solution as that used in Example 2-1.

The first coating solution was coated on a support which was travelling at a rate of 100 m/min. in a coating amount of 20 ml/m², and immediately thereafter the coated surface was smoothed by a smoothing roll. The second coating solution prepared by mixing α-$Al_2O_3$ and a 60 mμ carbon black dispersion in a mixing weight ratio of 1/1.5 and adding methyl ethyl ketone thereto to

| | |
| --- | --- |
| Ferromagnetic metal particles (composition: Fe—Ni alloy, specific surface area: 50 m²/g) | 100 parts |
| Copolymer of vinyl chloride/vinyl acetate/maleic anhydride (400 × 110A, manufactured by Nippon Zeon Co., Ltd., degree of polymerization: 400 | 12 parts |
| Polyurethane resin ("N-2301", a trade name, manufactured by Nippon Polyurethane Co., Ltd.) | 12 parts |
| Abrasive agent particles (see TABLE 5) | 3 parts |

| -continued | |
|---|---|
| Carbon black (See TABLE 5) | 1 part |
| Isocyanate hardening agent ("Collonate L", a trade name, manufactured by Nippon Polyurethane Co., Ltd.) | 8 parts |
| Stearic acid | 5 parts |
| Butyl stearate | 5 parts |
| Methyl ethyl ketone | 320 parts |

The above composition was dispersed and filtrated using a filter having an average pore diameter of 1 μm to prepare ferromagnetic particle dispersion.

The thus obtained ferromagnetic particle dispersion was coated at a coating speed rate of 100 m/min. with a coating amount of 20 ml/m² using an extrusion type coating head having a slit in the head, and the coated layer was dried and then subjected to calendering treatment under the same conditions as those in Example 2-1 and slit to a 8 mm width to prepare a 8 mm video tape, designated as Sample No. (Comparative Example) 2-1 to 2-3.

The coating conditions and characteristics of the tapes are shown in Table 4.

COMPARATIVE EXAMPLE 3

A simultaneously multi-coating (wet-on-wet coating method) was done using carbon black having an average particle diameter of 20 mμ under the same conditions as those in Example 2-1 regarding the mixing ratio of dispersions (abrasive agent particles: carbon black), the diluting ratio of the mixed dispersion, ratio of supplying amount of the second solution, coating rate and the coating amount rate, and the coated layer was subjected to magnetic orientation, dried and then was subjected to calendering treatment under the same condition as those in Example 2-1, and slit to a 8 mm width to prepare 8 mm video tape, designated as Sample No. (Comparative Example) 3-1.

The tape characteristics were measured and the results thereof are shown in Table 4.

COMPARATIVE EXAMPLE 4

The same procedure as in Example 2-1 was repeated except that the same abrasive agent particles α-$Al_2O_3$ and carbon black as those used in the second coating solution were added in the first coating solution to prepare a 8 mm video tape with the weight ratio of abrasive agent particles and lubricating agent particles which are present within 1 μm from the surface of the magnetic layer in the thickness direction to the abrasive agent particles and lubricating agent particles which are present within the whole magnetic layer being less than 100/(thickness of the magnetic layer-1) %.

To prepare the first coating solution, 5 parts of α-$Al_2O_3$ and 2 parts of carbon black based on 100 parts of ferromagnetic metal particles were added. The thickness thereof was 3.2 μm.

The coating conditions and the conditions for preparing the tape were the same as those in Example 2-1. The resulting tape is designated Sample No. (Comparative Example) 4-1. The results are shown in Table 4.

TABLE 4

| Sample No. | Type of abrasive agent particles | Carbon black average particle size (μm) | Coating method | Video sensitivity (dB) | S/N (dB) | Number of passes of head clogging | Decrease of outputs after 100 passes (dB) | Friction coefficient first pass | Friction coefficient 100th pass | Ratio of abrasive agent particles (%) (Remark-1) | Ratio of carbon black (%) (Remark-2) |
|---|---|---|---|---|---|---|---|---|---|---|---|
| Example 2-1 | α-Al₂O₃ | 60 mμ | Wet-on-wet method (simultaneously) | +1.2 | +1.5 | 200 or more | −1.0 | 0.30 | 0.31 | 100 | 92 |
| Example 2-2 | α-Al₂O₃ | 35 mμ | Wet-on-wet method (simultaneously) | +1.2 | +1.2 | 200 or more | −1.5 | 0.31 | 0.33 | 90 | 94 |
| Example 2-3 | α-Al₂O₃ | 60 mμ | Wet-on-wet method (simultaneously) | +1.2 | +1.7 | 200 or more | −0.5 | 0.28 | 0.28 | 92 | 90 |
| Example 2-4 | α-Al₂O₃ | 120 mμ | Wet-on-wet method (simultaneously) | +1.0 | +1.0 | 200 or more | −1.0 | 0.28 | 0.27 | 90 | 100 |
| Example 2-5 | α-Al₂O₃ | 120 mμ | Wet-on-wet method (simultaneously) | +1.0 | +1.2 | 200 or more | −0.5 | 0.27 | 0.27 | 83 | 100 |
| Example 2-6 | SiO₃ | 60 mμ | Wet-on-wet method (simultaneously) | +1.0 | +1.3 | 180 | −1.4 | 0.33 | 0.34 | 100 | 81 |
| Example 2-7 | SiO₂ | 120 mμ | Wet-on-wet method (simultaneously) | +1.0 | +1.0 | 200 or more | −1.0 | 0.31 | 0.29 | 90 | 100 |
| Example 3-1 | α-Al₂O₃ | 60 mμ | Wet-on-wet method (sequentially) | +1.0 | +1.7 | 200 or more | −0.7 | 0.27 | 0.26 | 100 | 100 |
| Comparative Example 2-1 | α-Al₂O₃ | 60 mμ | Single layer coating | 0.0 | 0.0 | 110 | −7.0 | 0.33 | 0.39 | 30 | 33 |
| Comparative Example 2-2 | α-Al₂O₃ | 120 mμ | Single layer coating | 0.0 | −0.5 | 130 | −10 | 0.32 | 0.39 | 30 | 33 |
| Comparative Example 2-3 | SiO₂ | 60 mμ | Single layer coating | 0.0 | −0.3 | 45 | −20 or less | 0.35 | 0.42 | 28 | 33 |
| Comparative Example 3-1 | α-Al₂O₃ | 20 mμ | Wet-on-wet method (simultaneously) | +1.1 | +1.0 | 140 | −15 | 0.35 | 0.40 | 100 | 80 |
| Comparative Example 4-1 | α-Al₂O₃ | 60 mμ | Wet-on-wet method (simultaneously) | +0.2 | 0.0 | 200 | −0.8 | 0.30 | 0.30 | 42 | 38 |

Remark-1: The weight ratio of abrasive agent particles which are present within 1 μm from the surface of the magnetic layer in the depth direction to abrasive agent particles which are present in the whole magnetic layer.
Remark-2: The weight ratio of lubricating agent particles which are present within 1 μm from the surface of the magnetic layer in the depth direction to lubricating agent particles which are present in the whole magnetic layer.

Evaluation of the characteristics shown in Tables 2 and 4 was made in the following manner.

The 8 mm video tape recorder "FUJIX-8 M6AF2" was used to evaluate the following characteristics (1) to (5).

(1) Video sensitivity

Values from peak to peak at RF output were read by an oscilloscope.

(2) S/N ratio

Noise was measured using a color video noise meter "925R-1 NYSC" manufactured by Shibasoku Co., Ltd.

The values of video sensitivity and S/N ratio are relative values, and were obtained by assigning a 0 (zero) dB value to the 8 mm video tape prepared in Comparative Example 1.

(3) Number of passes until head gap bridging occurs

While a tape was running repeatedly on the above described video tape recorder, the number of passes was counted until the output reached 0 (zero) due to head gap bridging on the magnetic head.

(4) Output after 100 passes

After a tape was for 100 passes on the above described video tape recorder, video sensitivity at the 100th pass was measured and compared with that measured at the first pass.

(5) Friction coefficient

A tape was run on the above described video tape recorder. The friction coefficient was indicated in terms of $\mu$ value calculated by the following equation, $$T_2/T_1 = \exp(\mu \times T_1)$$

where $T_1$ is the tape tension at the supplying side of the rotary cylinder of the VTR, and $T_2$ is the tape tension at the take-up side thereof. The friction coefficient was measured at 23° C. and 65% RH.

(6) Ratio of abrasive agent particles which are present near the surface of the magnetic layer The amount of abrasive agent particles which are present within 1 $\mu$m from the surface of the magnetic layer was measured using a thin film X-ray analysis apparatus (manufactured by Rigaku Denki Co., Ltd.). The whole amount of abrasive agent particles contained in the magnetic layer was measured using a general X-ray analysis apparatus (manufactured by Rigaku Denki Co., Ltd.)

A tape sample having abrasive agent particles uniformly dispersed in the magnetic layer was prepared. Using a thin film X-ray analysis apparatus and a general X-ray analysis apparatus, the change of integration strength to the additive amount of abrasive agent particles was measured and thus a so-called calibration curve was prepared.

The amount of abrasive agent particles which are present within 1 $\mu$m from the surface of the magnetic layer on each sample prepared in the Examples and Comparative Examples was calculated from the results of integration strength of X-ray analysis peak measured by the thin film X-ray analysis apparatus and the general X-ray analysis apparatus.

(7) Ratio of carbon

The thus obtained magnetic tape was soaked in 6N HCl to dissolve and remove the magnetic particles. The piece of the tape was soaked in liquid nitrogen to freeze the piece of the tape. The frozen tape was bent and cut and the cross section of the tape was observed by FE-SEM (Filed Emission Scanning Electron Microscope). The number of carbon particles was read by a photograph of the cross sectional view. Then, the ratio of carbon particles which are present within 1 $\mu$m from the surface of the magnetic layer to carbon particles which are present within the whole magnetic layer was calculated.

The following is clear from the above results.

Regarding the comparison between Example 2-3 and Comparative Example 2-1, between Example 2-5 and Comparative Example 2-2 and between Example 2-6 and Comparative Example 2-3, it is clearly seen from Table 4 that the characteristics of the Examples regarding the number of passes until head gap bridging occurs, decrease of output after 100 passes and friction coefficient at first pass and 100th pass are superior to those of the Comparative Examples. The reason is believed to be that as the magnetic layer of the present invention was provided by a wet-on-wet coating method (simultaneously coating), abrasive agent particles and carbon black could exist partially near the surface of the magnetic layer, as compared with the single layer provided by a conventional method.

The weight ratios of abrasive agent particles and carbon black which are present within 1 $\mu$m from the surface of the magnetic layer of the present invention to the abrasive agent particles and carbon black within the whole magnetic layer are 100/(thickness of the magnetic layer - 1) (%) (the "thickness of the magnetic layer" represents the thickness in "$\mu$m") or more and those values are larger than those in the Comparative Examples.

The tape of Comparative Example 3-1 and that of Example 2-1 were made under the same conditions, except that carbon black having an average particle diameter of 20 m$\mu$ was used in Comparative Example 3-1. When these tapes were compared therebetween, there was no difference in video sensitivities and S/N, but the characteristics as to the number of passes of head gap bridging and decrease of output after 100 passes were inferior in Comparative Example 3-1, and values of friction coefficient at first pass and 100th pass were higher in Comparative Example 3-1. This is because the particle size of carbon black used in Comparative Example 3-1 was too small, and could not act as lubricating agent particles to improve running properties and durability of the tape.

The tape of Comparative Example 4-1 which was prepared by a wet-on-wet (simultaneously) coating method, and having a ratio of abrasive agent particles and lubricating agent particles which are present within 1 $\mu$m from the surface of the magnetic layer which is outside the range as defined in the present invention, exhibited good running properties and durability, but had decreased video sensitivities and decreased S/N ratio.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a magnetic layer containing ferromagnetic particles dispersed in binders, said magnetic layer containing abrasive agent particles with lubricating agent particles, wherein the weight ratio of or each of the abrasive agent particles and lubricating agent particles which are present, within 1 $\mu$m in a thickness direction from the surface of said magnetic layer to (b) or each of the abrasive agent particles and lubricating agent particles, which are present, within the whole magnetic layer is at least 100/ (thickness of magnetic layer - 1) %, in which the "thickness of magnetic layer" represents the thickness in "$\mu$m" and is 2 $\mu$m or more.

2. The magnetic recording medium as claimed in claim 1, wherein said lubricating agent particles are carbon black.

3. A method for preparing a magnetic recording medium comprising: coating on a non-magnetic support a first coating composition having a ferromagnetic particles dispersed in binders, and simultaneously or successively coating thereon a second coating composition having a binder in which there is dispersed abrasive agent particles with lubricating agent particles, wherein the weight ratio of (a) each of the abrasive agent particles and lubricating agent particles which are present, within 1 $\mu$m in a thickness direction from the surface of said magnetic layer to (b) each of the abrasive agent particles and lubricating agent particles, which are present, within the whole magnetic layer is at least 100/(thickness of magnetic layer - ) %, in which the "thickness of magnetic layer" represents the thickness in "$\mu$m" and is 2 $\mu$m or $\mu$m or more.

4. The method for preparing a magnetic recording medium as claimed in claim 3, wherein at least one binder contained in the second coating composition is the same as that used in the first coating composition.

5. The method for preparing a magnetic recording medium as claimed in claim 3, wherein at least one solvent contained in the second coating composition comprising abrasive agent particles and lubricating agent particles, binders, and solvents is the same as that used in the first coating composition comprising ferromagnetic particles, binders and solvents.

6. The method for preparing a magnetic recording medium as claimed in claim 3, wherein at least one binder and at least one solvent contained in the second coating composition comprising abrasive agent particles and lubricating agent particles, binders, and solvents are the same as those used in the first coating composition comprising ferromagnetic particles, binders, and solvents.

7. The method for preparing a magnetic recording medium as claimed in claim 3, wherein said lubricating agent particles are carbon black.

8. The method for preparing a magnetic recording medium as claimed in claim 1, wherein the abrasive agent particles are $\alpha$-Al$_2$O$_3$, Cr$_2$O$_3$, $\alpha$-Fe$_2$O$_3$ or SiO$_2$.

* * * * *